(12) United States Patent
Kosik et al.

(10) Patent No.: US 6,358,186 B1
(45) Date of Patent: Mar. 19, 2002

(54) APPARATUS AND METHOD FOR CONTROLLING A TORQUE TRANSMITTING SYSTEM

(75) Inventors: Franz Kosik, Ostfildern; Thomas Grass, Urbach; Klaus Henneberger, Erlangen; Michael Reuschel, Bühl, all of (DE)

(73) Assignee: LuK Getriebe Systeme GmbH, Buhl/Baden (DE)

(*) Notice: Subject to any disclaimer, the term of this patent is extended or adjusted under 35 U.S.C. 154(b) by 0 days.

(21) Appl. No.: 08/821,001

(22) Filed: Mar. 20, 1997

(30) Foreign Application Priority Data

Mar. 21, 1996 (DE) .......................... 196 11 147

(51) Int. Cl.$^7$ ............................................. B60K 41/02
(52) U.S. Cl. .......................................... 477/176; 477/79
(58) Field of Search ............................ 477/79, 86, 166, 477/168, 169, 174, 175, 179, 180, 904, 905, 12

(56) References Cited

U.S. PATENT DOCUMENTS

| | | | |
|---|---|---|---|
| 4,494,641 A | * 1/1985 | Sakakiyama | 477/179 X |
| 4,593,580 A | * 6/1986 | Schulze | 74/858 |
| 4,711,333 A | * 12/1987 | Okamura | 477/86 X |
| 4,723,644 A | * 2/1988 | Sakakiyama | 477/179 X |
| 4,792,027 A | * 12/1988 | Ohkumo | 477/180 X |
| 4,969,545 A | * 11/1990 | Hayashi | 477/180 X |
| 5,152,192 A | * 10/1992 | Koenig et al. | 74/862 |
| 5,213,186 A | * 5/1993 | Murata | 477/174 X |
| 5,265,017 A | * 11/1993 | Kaya et al. | 74/866 X |
| 5,317,937 A | * 6/1994 | Yoshizawa et al. | 477/120 |
| 5,439,428 A | * 8/1995 | Slicker | 477/86 X |
| 5,499,953 A | * 3/1996 | Hayasaki | 477/120 |
| 5,507,705 A | * 4/1996 | Hara | 477/408 |
| 5,738,609 A | * 4/1998 | Jones et al. | 477/175 |
| 5,807,204 A | * 9/1998 | Shiiba et al. | 477/176 |
| 5,833,579 A | * 11/1998 | Ghil | 477/174 X |
| 6,059,691 A | * 3/2000 | McDonald et al. | 477/176 |
| 6,059,690 A | * 5/2000 | Tanizawa et al. | 477/174 X |

* cited by examiner

Primary Examiner—Charles A Marmor
Assistant Examiner—Roger Pang
(74) Attorney, Agent, or Firm—Darby & Darby

(57) ABSTRACT

The present invention relates to an apparatus and method for controlling a torque transmitting system and the torque transmittable by the torque transmitting system in a power train of a vehicle with a transmission and an engine, and with at least one actuator controllable by a control unit, such as an actuating unit, for operating the torque transmitting system. This is accomplished in that, in at least one operating state, such as starting or acceleration state, the control unit shifts between at least two operating states of the torque transmitting system in which the system transmitting different torques, so that a different, such as a higher or a lower, torque can be selected and transmitted in the respective operating states for providing a different, such as a higher or a lower, torque to power the vehicle.

18 Claims, 11 Drawing Sheets

APPARATUS AND METHOD FOR CONTROLLING A TORQUE TRANSMITTING SYSTEM

BACKGROUND OF THE INVENTION

The invention relates to an apparatus for controlling a torque transmitting system in a power train of a motor vehicle with a transmission and an engine, with an actuator controlled by a control unit for operating the torque transmitting system.

Apparatuses of this type are known in the art. Automobiles equipped with controlling devices of the aforementioned kind are controlled by the control unit during starting or acceleration phases using a method such that a starting phase takes place with a presentable engine torque and a presentable engine rotation (speed), whereby the torque transmitting system at a preset engine torque and a preset engine speed is intentionally engaged (closed) for accelerating the motor vehicle. Since it is not advantageous in all situations for the motor vehicle to start with the maximum acceleration, the engine torque is in general controlled to a value which is smaller than the maximum engine torque. If a partially loaded motor vehicle is accelerated, for example, from rest in, for example, level terrain using this apparatus and method, then this acceleration is usually sufficient. If, however, a significantly loaded motor vehicle is accelerated from rest on an incline, then this acceleration may be too small.

SUMMARY OF THE INVENTION

It is the object of the present invention to provide an apparatus of the aforedescribed type and a method which permit acceleration of a motor vehicle to be easily started up and accelerated from rest even if the motor vehicle is fully loaded and is positioned on an incline. It is another object of the invention to provide an apparatus and/or a method permitting an intentional controlled shifting of the accelerating or driving torque.

Further, the present invention provides an apparatus which constitutes an improvement over the conventional apparatus and which can be manufactured inexpensively and which is easy to use.

Even further, the present invention provides a control unit in at least one operating condition or state, such as starting or acceleration condition, which shifts between at least two operating states of the torque transmitting system with different transmittable torque, with the possibility to control a different, such as a higher or a lower, transmittable torque in the respective operating states, so that a different, such as a higher or a lower, torque is provided to power the motor vehicle. Thus, the invention provides an apparatus for controlling an actuatable torque transmitting system and a torque being transmitted at different rates by the torque transmitting system in a power train provided in a motor vehicle and further including an engine and a transmission arranged to drive the vehicle and to receive torque from the torque transmitting system. This apparatus includes a control unit and an actuator which is controllable by the control unit and which is arranged to actuate the torque transmitting system, such as a clutch, and wherein the control unit has at least one operating condition in which the actuator is arranged to effect a planned transmission of torque by the system at least at two different rates at each of which the transmission receives a different torque.

The engine electronics controls an engine torque and an engine rotation (speed) when the driver operates a load lever. Simultaneously, the torque transmitting system is controlled by the control unit in such a way that an intended torque can be transmitted. As a result of this control of the control unit and the engine, an equilibrium is established with respect to engine torque and engine RPM. Through the intentional shifting operation by way of a intentional control of the torque transmitting system, a different equilibrium state can be controlled at a higher engine RPM and a higher engine torque. This intentional shifting of the transmittable torque of the torque transmitting system consequently results in controlling the equilibrium state at different engine parameters leading to an intended increase/decrease of the accelerating engine torque.

According to the feature of the invention, it may be advantageous for the control unit to control intentional shifting between at least two operating states, such as starting and acceleration states. The two different operating states are characterized by different equilibrium conditions with respect to the engine torque and the engine RPM.

It is advantageous for the control unit to control shifting between at least two states depending on data sets, such as signals, quantities or other operating parameters, which are accumulated, determined and/or processed.

It is particularly advantageous in an apparatus of the invention if the control unit compares at least one data set with at least one presentable threshold value and controls shifting between two operating states, when at least one data set has at least reached, exceeded or lagged behind a threshold value. The at least one threshold value may be generated by the control unit depending on the operating point. The at least one threshold value may furthermore be determined from mapping, characteristic curves or by way of functional dependencies. The threshold values can be retrieved from or may be stored in memory.

It is also advantageous for the control unit to initiate a shifting operation between operating states when at least one data set which is detected or determined as a function of time, reaches, exceeds or fails to reach a presentable threshold value after a preset time.

In addition, it is advantageous if the control unit initiates a shifting operation between operating states when a sensor indicates that a load lever, such as a gas pedal, is operated in such a way that a preset threshold value for the load lever position has or has not been reached or exceeded.

Also, if the control unit initiates a shifting operation between operating states when during a first acceleration phase or starting phase of the motor vehicle a quantity representing the transmission input RPM, has not increased above a presentable threshold value after a preset time interval.

Further, it is advantageous if the control unit initiates a shifting operation from an operating state with a lower transmittable torque into a state with a higher transmittable torque in such a way that, during a first phase, there is effected an at least small decrease of the transmittable torque of the torque transmitting system, and that, during a second phase, the transmittable torque is increased to a higher target value.

Even further, it is advantageous if the control unit activates a shifting operation from an operating state with a higher transmittable torque into a state with a lower transmittable torque in such a way that, during a first phase, there is effected an at least small increase of the transmittable torque of the torque transmitting system, and that, during a second phase, the transmittable torque is decreased to a lower target value.

It is a particularly advantageous if the transmittable torque $M_{kset}$ of the torque transmitting system which is controlled by the control unit, is a function of the engine RPM $n_{mot}$: $M_{kset}=k*f(n_{mot})$ wherein k is a proportionality factor which can also be varied. In this case, it is advantageous if the control unit determines the transmittable torque of the torque transmitting system, when there is a shift from one operating state into another operating state, according to the formula $M_{kset}=k*f(n_{mot})$, wherein the control unit selects the value for k from within a range of values between 0 and a maximum value $k_{max}$ and changes, for example increases or decreases, this value for k for a shifting operation.

In addition, it is advantageous according to the invention if during a intentional controlled switching operation from a first operating state into a second operating state with a higher transmittable torque, the control unit controls the torque at the driving end in such a way that the torque at the output end resulting from the transmittable engine torque is increased.

Moreover, it is advantageous in a method for controlling a torque transmitting system in the power train of a motor vehicle with a transmission, a torque transmitting system and an engine, with an apparatus for controlling a torque transmitting system, with at least one actuator controllable by a control unit, such as an actuating unit, for operating the torque transmitting system, wherein the control unit is in signal communication with sensors and possibly with other electronic units, that the control unit executes at least the following process steps:
  a) recognizing an operating state, such as a starting or acceleration state, based on at least one data set, such as a sensor signal, b) recognizing an insufficient acceleration by resorting to at least one data set, such as a sensor signal, and c) initiating a different operating state with an increased driving torque.

Thus, a method is provided for controlling a torque transmitting system having different actuation states and being disposed in a power train of an accelerable motor vehicle, the method comprising the steps of: a) utilizing a control unit for monitoring the actuation states of the torque transmitting system based on at least one data set; b) utilizing the control unit for the detection of a potential insufficient acceleration of the motor vehicle based on at least one data set; and c) initiating an increased torque transmission in response to detection of insufficient acceleration.

It is also advantageous if the control unit executes at least the following method steps: a) recognizing an operating state, such as a starting or acceleration state, based on at least one data set, such as a sensor signal, b) recognizing an excessively high acceleration based on at least one data set, such as a sensor signal, and c) initiating a different operating state with an decreased driving torque. Thus, an other method is provided for controlling a torque transmitting system having different actuation states and being disposed in a power train of an acceleratable motor vehicle. Here, the method includes the steps of utilizing a control unit for monitoring the actuation states of the torque transmitting system based on a data set and utilizing the control unit for the detection of a potential excessive acceleration of a vehicle based on a data set; and initiating a decreased torque transmission in response to detection of excessive acceleration.

According to the invention, the control unit recognizes an operating state, such as a starting or acceleration state, based on at least one data set, such as a sensor signal, wherein a starting or acceleration state can be detected by way of at least one activated load lever, inactive brakes or a gear engaged in the transmission.

It is advantageous if the control unit accumulates or processes at least one quantity or a data set as a function of time and at least in general compares said at least one quantity to a presentable threshold value, wherein said quantity is a measure of the speed or acceleration of the vehicle.

The increase in torque available for accelerating the motor vehicle may be in the range of a few % to 50% of the nominal torque, depending on the engine torque for a normal starting phase and without shifting to a higher torque.

The increase in torque for accelerating the motor vehicle is achieved by controlling the torque transmitting system without changing the operation of the load lever. This is achieved in that the original equilibrium state with an engine torque and an engine RPM is set by a transmittable torque which is applied to the engine as load torque. If the transmittable torque is briefly reduced, then the engine RPM increases, resulting in a state with a higher engine torque. If the transmittable torque is subsequently increased, then an equilibrium state is reached again, with the resulting engine torque being larger than in the previous equilibrium state.

It is also advantageous to construct an apparatus for controlling a torque transmitting system and the torque transmittable by the torque transmitting system in the power train of a motor vehicle with a transmission and an engine with a load lever, with at least one actuator controllable by a control unit, such as an actuating unit, for operating the torque transmitting system, in such a way that the control unit, in at least one operating state, when the load lever is set to a load lever value, such as starting or acceleration state, if the acceleration of the vehicle is too small or too large, shifts between at least two operating states of the torque transmitting system having different transmittable torque by intentionally controlling the torque transmittable by the torque transmitting system, so that for a given load lever value a different, such as larger or smaller, available engine torque for powering the motor vehicle is generated. It is particularly advantageous, assuming that the load lever is operated in the same manner, if shifting to a larger or smaller available engine torque for accelerating or starting the motor vehicle is generally attained solely by an intentional change or activation/control of the torque transmittable by the clutch.

It is also advantageous if the larger available engine torque is the maximum engine torque.

It is furthermore advantageous if the control unit initiates shifting between operating states only when a sensor indicates that a load lever, such as the gas pedal, is operated in a way that a predetermined threshold value of the load lever value has or has not been reached or exceeded.

It is especially advantageous if the control unit, when determining an insufficient or excessive acceleration of the motor vehicle based on data sets, such as signals, quantities, sensor signals or other operating parameters which are accumulated, detected and/or processed, initiates shifting between two operating states.

It is advantageous if the apparatus according to the invention if the control unit compares at least one data set with at least one presentable threshold value for detecting an insufficient or excessive acceleration when at least one data set has at least reached, exceeded or is below one threshold value.

It is also advantageous if the control unit determines an insufficient or excessive acceleration and initiates shifting between two operating states, when at least one data set which is detected or determined as a function of time, reaches, does not reach, exceeds or drops below a presentable threshold value after a preset time period.

In addition, it is advantageous if the control unit determines an excessively weak acceleration and initiates shifting between two operating states, when during a first acceleration phase or starting phase of the vehicle a quantity representing the transmission input RPM has not increased above a presentable threshold value after a preset time period.

In an apparatus of the invention, it may be advantageous if the control unit initiates shifting from an operating state with a smaller transmittable torque of the torque transmitting system and a smaller available engine torque to a state with a larger transmittable torque of the torque transmitting system and a larger available engine torque in such a way that, during a first phase, there is initiated an at least small decrease of the transmittable torque of the torque transmitting system and that, in a second phase, the transmittable torque of the torque transmitting system is increased to a larger target value.

It may also be advantageous if the control unit initiates shifting from an operating state with a larger transmittable torque of the torque transmitting system and a larger available engine torque to a state with a smaller transmittable torque of the torque transmitting system and a smaller available engine torque in such a way that, during a first phase, there is selected an increase of the transmittable torque of the torque transmitting system and that, during a second phase, the transmittable torque of the torque transmitting system is decreased to a smaller target value.

It may also be advantageous if the transmittable torque selected by the control unit $M_{kset}$ of the torque transmitting system is a function f of the engine RPM $n_{mot}$:

$$M_{kset}=k*f(n_{mot}).$$

It may be particularly advantageous if during a controlled shifting operation from one operating state into another operating state, the control unit determines the transmittable torque of the torque transmitting system according to $M_{kset}=k*f(n_{mot})$, wherein the control unit selects the value of k from a range of values between 0 and a maximum value $k_{max}$ and changes, such as increases or decreases, the value of k during a shifting operation.

Furthermore, it is advantageous if during a intentional controlled shifting operation from a first operating state into a second operating state with a higher transmittable torque and a higher available engine torque, the control unit controls the driving torque acting on the drive in such a way that the torque which results from the transmittable engine torque at the output end, is increased.

A method of the invention for controlling a torque transmitting system in the power train of a vehicle with a transmission, a torque transmitting system and an engine, with an apparatus for controlling a torque transmitting system, with at least one actuator controllable by a control unit, such as an actuating unit, for operating the torque transmitting system, wherein the control unit is in signal communication with sensors and possibly with other electronic units, may advantageously be characterized in that the control unit executes or controls at least the following method steps:

a) recognizing an operating state, such as a starting or acceleration state, based on at least one data set, such as a sensor signal, b) recognizing the actual load lever value and comparing the load lever value with a threshold value and evaluating if the load lever value exceeds the threshold value c) recognizing an excessively low acceleration based on at least one data set, such as a sensor signal, d) controlling the torque transmitting system for switching from a state with a smaller transmittable torque and smaller available engine torque into a state with a larger transmittable torque of the torque transmitting system and larger available engine torque such that during a first phase there is initiated a reduction of the transmittable torque and during a second phase, the transmittable torque is increased to a higher target value.

Further, a method according to the invention for controlling a torque transmitting system in the power train of a vehicle with a transmission, a torque transmitting system and an engine, with an apparatus for controlling a torque transmitting system, with at least one actuator controllable by a control unit, such as an actuating unit, for operating the torque transmitting system, wherein the control unit is in signal communication with sensors and possibly with other electronic units, may also be preferably characterized in that the control unit executes, such as controls or regulates, at least the following process steps: recognizing an operating state, such as a starting or acceleration state, based on at least one data set, such as a sensor signal, recognizing the actual load lever value and comparing the load lever value with a threshold value and evaluating if the load lever value exceeds the threshold value, recognizing an excessively high acceleration based on at least one data set, such as a sensor signal, controlling the torque transmitting system for switching from a state with a larger transmittable torque and larger available engine torque into a state with a smaller transmittable torque of the torque transmitting system and smaller available engine torque such that during a first phase there is brought about an increase of the transmittable torque and during a second phase, the transmittable torque is decreased to a lower target value.

It is advantageous if the control unit recognizes an operating state, such as a starting or acceleration state, based on at least one data set, such as a sensor signal, wherein a starting or acceleration state can be detected by way of at least one activated load lever, inactive brakes or a gear engaged in the transmission.

Also, it is advantageous if the control unit determines or processes at least one quantity or a data set as a function of time and at least in general compares said at least one quantity to a presentable threshold value, wherein said quantity is a measure for the speed or acceleration of the vehicle.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
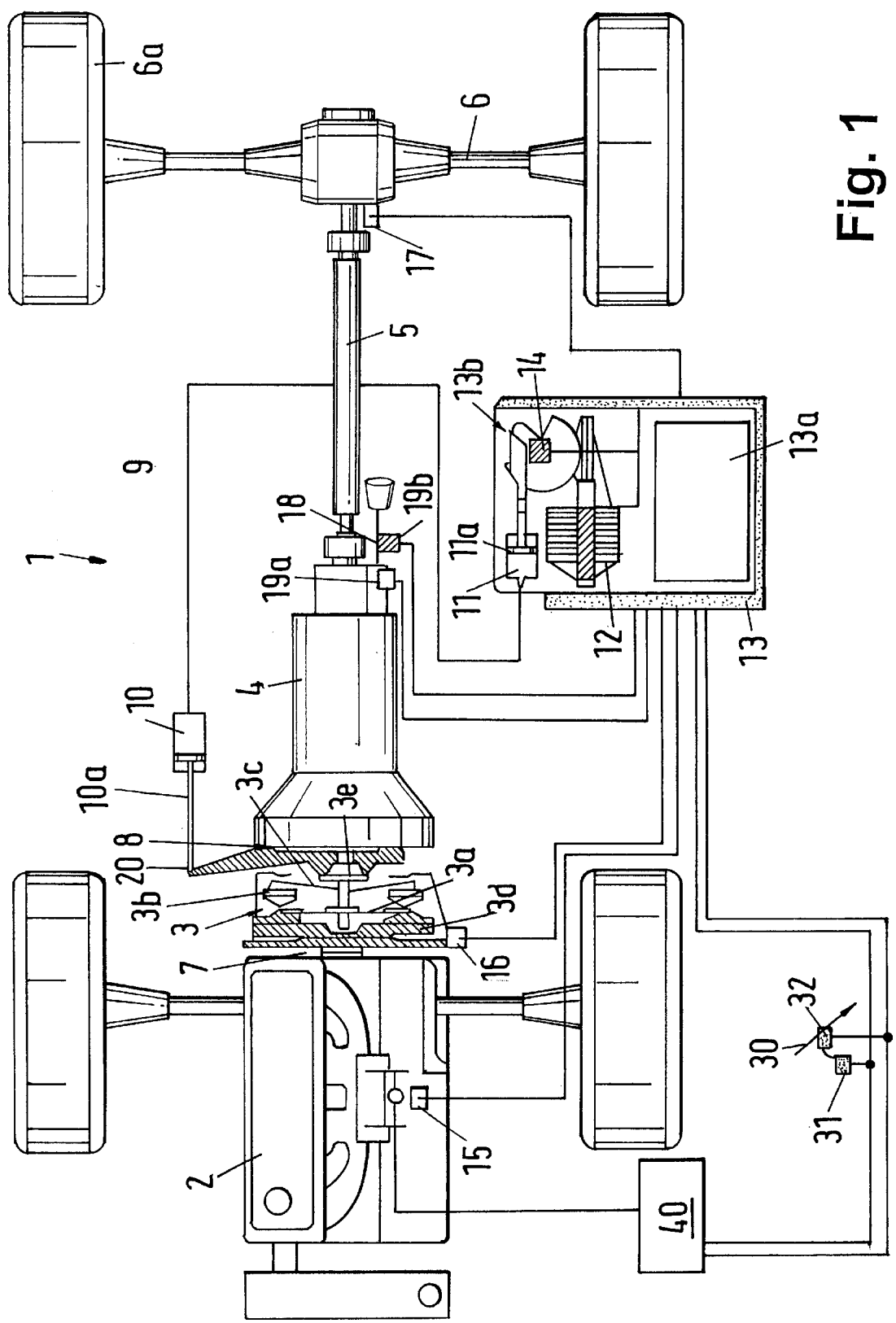
FIG. 1 is a schematic representation of a vehicle.

FIG. 1 schematically depicts a vehicle 1 with a drive unit 2, such as a motor or an internal combustion engine. In the power train of the vehicle, there is further shown a torque transmitting system 3 and a transmission 4. In this embodiment, the torque transmitting system 3 is disposed in the power path between engine and transmission, wherein a driving torque of the engine is transmitted through the torque transmitting system to the transmission and from the transmission 4 at the driving end to a drive shaft 5 and an axle 6 and the wheels 6a, in that order.

The torque transmitting system 3 is formed as a clutch, such as a friction clutch, multi-disk clutch, magnetic powder clutch or torque converter bypass clutch, wherein the clutch may be a self-adjusting clutch compensating for wear. The transmission 4 is depicted as a manual transmission, such as a gear change box. According to the inventive concept, the transmission may also be an automatic transmission capable of being shifted automatically by way of at least one actuator. Also regarded as an automatic transmission can be an automatic transmission which is shifted while the tractive force is interrupted and where the shifting operation of the transmission gear ratio is executed upon activation through at least one actuator. In addition, a different type of automatic transmission may be employed which is usually constructed from planetary gears and wherein the tractive force is generally not interrupted during the shifting operation. A continuously adjustable transmission may also be employed, such as conical belt drive. This type of automatic transmission may also be provided with a torque transmitting system at the output end, such as a clutch or friction clutch. The torque transmitting system may also be constructed as starting and/or reversing clutch for reversing the sense of rotation and/or as safety clutch with a settable transmittable torque.

The torque transmitting system 3 comprises a drive side 7 and an output side 8 with a torque being transmitted from the drive side 7 to the output side 8 by applying power to the clutch disk 3a via the pressure plate 3b, the disk spring 3c and the throw-out bearing 3c as well as the flywheel 3d. For applying power, the clutch release fork lever 20 is operated through an operating means, such as an actuator.

The torque transmitting system 3 is controlled through a control unit 13, or a control apparatus, which may comprise the control electronics 13a and the actuator 13b. In another advantageous embodiment, the actuator and the control electronics may also be placed in two different assemblies, such as housings.

The control unit 13 may comprise the control and power electronics for controlling the electric motor 12 of actuator 13b. In this way, the system may advantageously require only one equipment space, namely the space for the actuator and the electronics. The actuator comprises a drive motor 12, such as an electric motor, wherein the electric motor 12 acts upon a master cylinder 11 via a gear, such as a worm gear, or a spur gear or a crank gear or a threaded spindle gear. The master cylinder may be actuated directly or via levers.

The movement of the output element of the actuator, such as the master cylinder piston 11a, is sensed by a clutch travel sensor 14 which senses the position or orientation or the velocity or acceleration of a quantity that is proportional to the position or condition of engagement or to the velocity or acceleration of the clutch, respectively. The master cylinder 11 is connected to a slave cylinder 10 via conduit 9 for pressurized fluid, such as a hydraulic line. The output element 10a of the slave cylinder is operatively connected with the clutch release fork lever or release means 20, so that a movement of the output element 10a of the slave cylinder 10 causes the release means 20 to move or tilt also for controlling the torque adapted to be transmitted by the clutch 3.

The actuator 13b for selecting the magnitude of the torque to be transmitted by the torque transmitting system 3 may be adapted for hydraulic operation, i.e. the actuator 13b may be provided with hydraulic master and slave cylinder. The pressure medium may be, for example, a hydraulic fluid or a pneumatic medium. The hydraulic master cylinder may be operated by an electronically controllable electric motor. The drive element of actuator 13b may be, aside from an electric motor, also a different, for example, hydraulically operated drive element. Magnetic actuators may also be employed for setting the position of an element, In a friction clutch, the transmittable torque is controlled by intentionally applying pressure to the friction linings of the clutch disk between the flywheel 3d and the pressure plate 3b. The pressure applied by the pressure plate to the friction linings can be controlled through the position of the release means 20, such as clutch release fork or central release, wherein the pressure plate can be moved, freely adjusted and fixed between two end positions. One of the end positions corresponds to a completely engaged clutch position, the other end position corresponds to a completely disengaged clutch position. For selecting a transmittable torque, for example a torque smaller than the actually applied engine torque, the pressure plate 3b may, for example, be caused to assume a position disposed between the two end positions. The clutch can be fixed to that position by actively controlling the release means 20 in that position. However, transmitted clutch torques with well defined values greater than the actual applied engine torques may also be selected. In this case, the actually existing or prevailing engine torques may be transmitted, whereby the torque irregularities in the power train which manifest themselves, for example, as peak torques, are damped and/or isolated.

Furthermore, for controlling the torque transmitting system there are employed sensors which at least temporarily monitor the relevant quantities of the entire system and provide the status variables, signals and measurement values to be processed by the control unit, wherein there may be provided or there may exist a signal link to other electronic units, for example to engine electronics or electronics of an anti-blocking system (ABS) or an anti-slip control (ASR). The sensors measure, for example, the RPM, such as wheel RPM, engine RPM, the position of the load lever, the throttle position, the gear position of the transmission, a shifting intent as well as other vehicle-specific parameters.

In FIG. 1 there are depicted a throttle position sensor 15, an engine RPM sensor 16 and a tachometer sensor 17, supplying measurement values and information, respectively, to the control unit. The electronics unit, such as computer unit, of the control unit 13*a* processes system input values and conveys control signals to the actuator 13*b*.

The transmission is constructed as a gear change box, wherein the gear ratios are changed via a shift lever or the transmission is operated via this shift lever. In addition, there is disposed at the operating lever, such as shift lever 18, of the manual transmission at least one sensor 19*b* for sensing the shifting intent and/or the gear position and transmitting this information to the control unit. A sensor 19*a* is connected to the transmission and senses the gear position and/or a shifting intent. A shifting intent can be recognized by using at least one of the two sensors 19*a*, 19*b* in that the sensor is a force sensor which senses the force applied to the shift lever. In addition, the sensor may be designed as a travel or position sensor, whereby the control unit recognizes a shifting intent from the change in the position signal over time.

The control unit is at least temporarily in signal communication with all sensors and evaluates the sensor signals and system input values in a manner that, depending on the actual operating point, the control unit provides control commands to the at least one actuator. The drive element 12 of the actuator, such as electric motor, receives from the control unit which controls the operation of the clutch, a controlling variable depending on the measurement values and/or system input values and/or signals of the connected sensor means. For this purpose, a control program is implemented in the control unit in form of hardware and/or software for evaluating the incoming signals and calculating and determining the outgoing values based on a comparison and/or functions and/or mapping.

The control unit 13 advantageously employs a torque determining unit, a gear position determining unit, a slip determining unit and/or an operating condition determining unit and is in signal communication with at least one of these units. The units may be implemented through control programs as hardware and/or as software, so that through the incoming sensor signals, it is possible to determine the torque of the drive unit 2 of the vehicle 1, the gear position of the transmission 4 as well as the slip occurring in the region of the torque transmitting system and the actual operating state of the vehicle. The gear position determining unit assertains the actually engaged gear based on the signals from sensors 19*a* and 19*b*. Here, the sensors are connected to the shift lever and/or to transmission-internal actuating means, for example to a central shift shaft or shift rod, for detecting, for example, the position and/or speed of these elements. There may also be provided on the load lever 30, such as the gas pedal, a load lever sensor 31 for detecting the load lever position. Another sensor 32 may function as an idle switch, i.e. said idle switch 32 is engaged when the gas pedal, e.g. load lever, is operated, and is disengaged when no signal is present, so that this digital information renders it possible to recognize if the load lever, e.g. gas pedal, is operated. The load lever sensor 31 detects the degree to which the load lever is operated.

Figure 2:
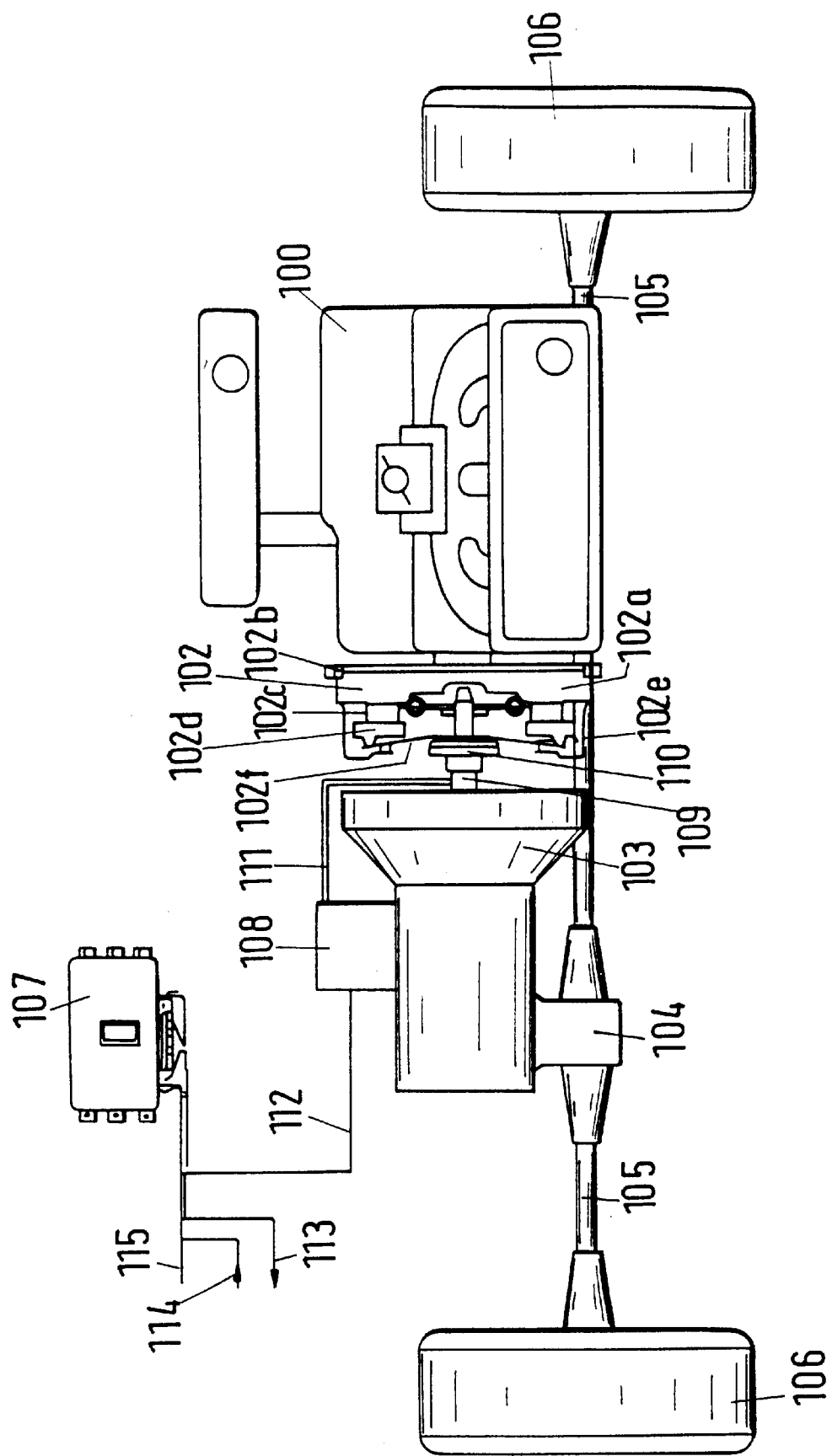
FIG. 2 is a schematic representation of a power train of a vehicle.

FIG. 2 shows schematically a power train of a vehicle with a drive unit 100, a torque transmitting system 102, a transmission 103, a differential 104 as well as drive axles 109 and wheels 106. The torque transmitting system 102 is disposed on or at a flywheel 102*a* and secured thereto, and as a rule the flywheel is provided with a starter gear 102*b*. The torque transmitting system comprises a pressure plate 102*d*, a clutch cover 102*e*, a disk spring 102*f* and a clutch disk 102*c* with friction linings. Between the pressure plate 102*d* and the flywheel 102*a*, there is disposed a clutch disk 102*c*, if necessary with a damping member. An energy storing apparatus, such as a disk spring 102*f*, biases the pressure plate axially in the direction towards the clutch disk, with a release bearing 109, for example a hydraulically or pneumatically operated central release, provided for operating the torque transmitting system. Between the central release and the prongs of disk spring 102*f*, there is disposed a release bearing 110. The disk spring is activated by an axial displacement of the release bearing, thereby disengaging the clutch. The clutch may be formed as a push or pull-type clutch.

The actuator 108 is the actuator of an automatic transmission which comprises also the actuating means for the torque transmitting system. The actuator 108 operates transmission-internal shifting elements, such as a shift drum or shift rods or a central shift shaft of the transmission, which operate to engage or disengage the gears, for example sequentially, but also in an arbitrary order. The clutch actuating element 109 is operated through the link 111. The control unit 107 is connected for signal communication with the actuator through signal link 112, wherein the signal links 113 to 115 are in signal communication with the control unit, with the link 114 processing the incoming signals, the link 113 processing control signals from the control unit, and the link 115 providing a link to the other electronic units, for example via a data bus.

For starting the vehicle essentially from rest or from a slow rolling motion, i.e. for accelerating the vehicle, the driver essentially operates only the gas pedal, e.g. the load lever 30, with the transmittable torque of the torque transmitting system during a starting phase being controlled or activated through the operation of the automated clutch via the actuator.

The request from the driver for more or less pronounced, or more or less rapid acceleration is detected through the load lever sensor 31 when the load lever is operated, and subsequently implemented by the control unit. The gas pedal and the sensor signals of the gas pedal are used as input values for controlling the starting phase of the vehicle.

During a starting phase, the transmittable torque, such as clutch torque $M_{kser}$, is determined essentially through a presentable function or through characteristic curves or mapping, for example as a function of the engine RPM, wherein the dependence on the engine RPM or other quantities, such as the engine torque, is advantageously implemented via a mapping or a characteristic curve.

If, when starting essentially from rest, the load lever or the gas pedal is operated to a specific value $\alpha$, then a engine torque is controlled via an engine control 40 (FIG. 1). The control unit of the automatic clutch activation 13 controls the transmittable torque of the torque transmitting system based on presentable functions or mapping, so that a steady equilibrium between the controlled torque and the clutch torque is established. The equilibrium is characterized by the position $\alpha$ of the load lever, a defined starting RPM, a starting or an engine torque as well as a defined transmittable torque of the torque transmitting system and a torque transmitted to the wheels, such as a driving torque. The functional relationship of the starting torque as a function of the starting rotation is subsequently called starting characteristics.

Figure 3:
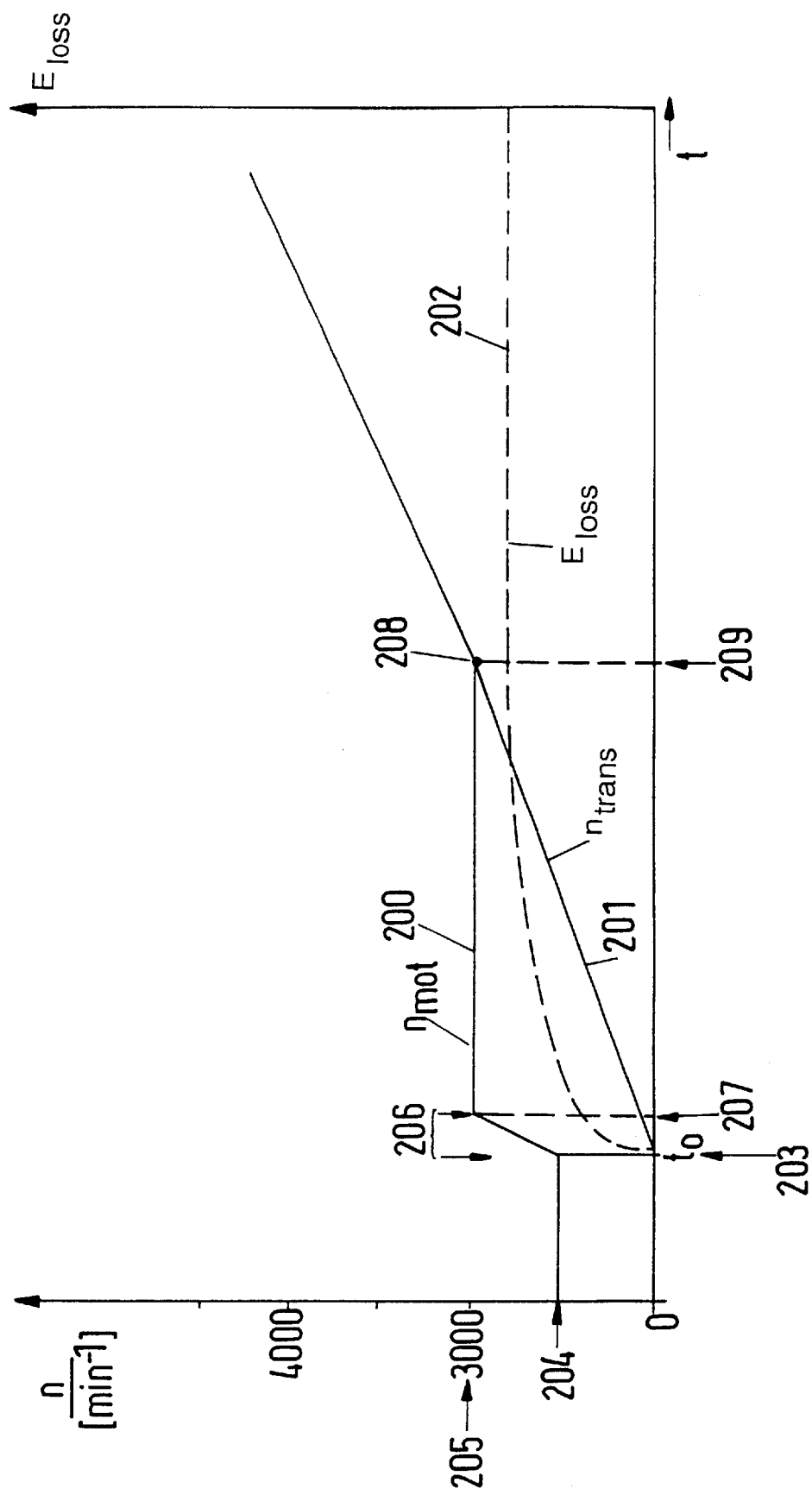
FIG. 3 is a diagram illustrating the rotation and energy loss as a function of time (starting phase)

FIG. 3 shows a diagram with rotation and energy losses plotted as a function of time. FIG. 3 depicts by way of example the chronological evolution of RPM and energy losses during a starting phase, wherein the energy loss is generated by friction in the region of the friction surfaces and complementary friction surfaces, such as the friction linings, of the torque transmitting system. The curve 200 shows the engine RPM as a function of time, curve 201 shows a transmission RPM, for example the transmission input RPM, and the dotted or dashed curve 202 represents the accumulated energy loss generated in the region of the torque transmitting system during the starting phase.

For times $t<t_0$ (203), the engine RPM $n_{mot}$ (200) is equal to the idling RPM 204 and the transmission input RPM $n_{trans}$ 201 may be slightly different from zero if the vehicle is rolling forward or backward, which may happen if the vehicle is left standing on an incline without applied brakes.

At time $t=t_0$ (203) the load lever or the gas pedal is operated, whereby the engine RPM increases from the idling RPM 204 to a value 205. When the load lever is operated, the engine control controls the engine in such a way that the engine torque and the engine RPM increase. In the embodiment of FIG. 3, the value 205 is, for example, equal to 2000/min. This value is a preferred value of the engine RPM for a starting phase, providing an average acceleration and an average torque for starting. The time interval $\Delta t$, where the engine RPM increases from the value 204 which corresponds essentially to the idling RPM, to the value 205, is labeled 206. When the engine RPM 200 increases, starting at $t=t_0$, the transmission input RPM increases simultaneously. The engine RPM 200 becomes essentially constant from time 207 on which is the end point of time interval 206, wherein the torque transmitting system is controlled in such a way that the transmission input RPM increases almost uniformly or in a different fashion, such as on an increasing or decreasing scale.

At the synchronizing point 208, the transmission input RPM is essentially equal to the engine RPM, whereas for times t larger than time 209, the engine RPM and the transmission RPM increase essentially as an identical or synchronous rate.

The curve 202 shows the energy loss in the region of the torque transmitting system generated, for example, through friction of the friction linings between flywheel and pressure plate. The energy loss increases rapidly from time 203 until time 209, while remaining essentially constant from time 209 on. The rapid increase at time 203 results from the difference in RPM between engine RPM and transmission input RPM, i.e. slip, which is largest at time 203.

Figure 4:
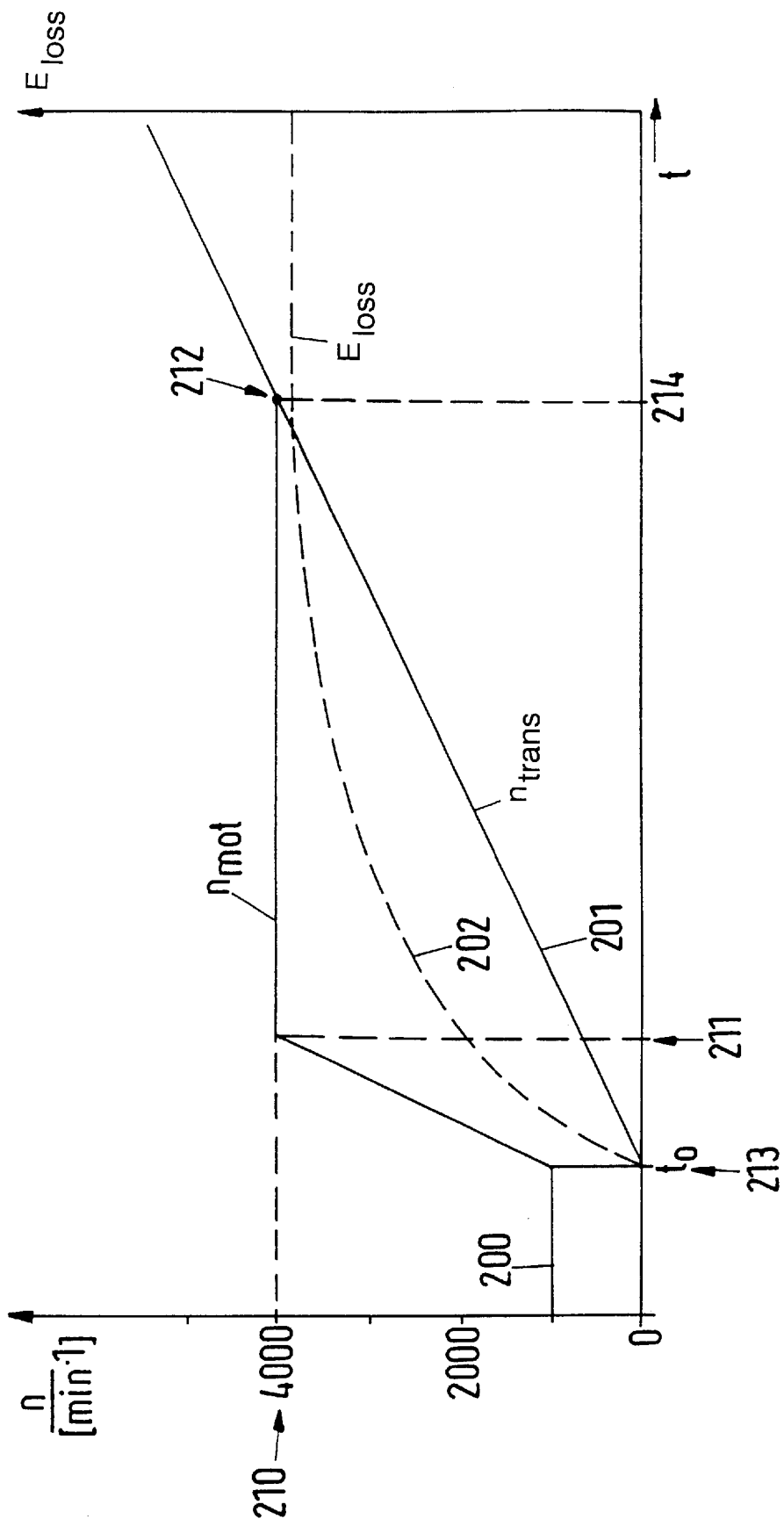
FIG. 4 is a diagram illustrating the rotation and energy loss as a function of time.

FIG. 4 shows a diagram wherein the engine RPM 200 and a transmission RPM 201, for example the transmission input RPM, are again represented as a function of time, and additionally, the energy loss 202 is also shown as a function of time. At times $t<t_0$ the engine RPM is essentially in the range of the idling RPM, i.e. the load lever is not operated and the engine electronics controls the idling. The transmission input RPM 201 is essentially equal to zero. From $t=t_0$ on, the load lever is operated and the engine RPM 200 increases, reaching a value 210 at time 211. At times t exceeding the time 211, the engine RPM is essentially constant, until the synchronizing point 212 is reached. The transmission input RPM increases during the time interval between time $t_0$ (213) and time 214. For t>time 214, the engine RPM and the transmission RPM increase essentially in synchronous fashion.

The energy loss represented by the curve 202 is significantly higher than the energy loss of the embodiment of FIG. 3. This occurs because during the time interval between time 211 and time 214, the engine RPM is significantly higher than the engine RPM during the time interval between time 207 and time 209. This results in a significantly greater initial slip than in the embodiment of FIG. 3.

Figure 5:
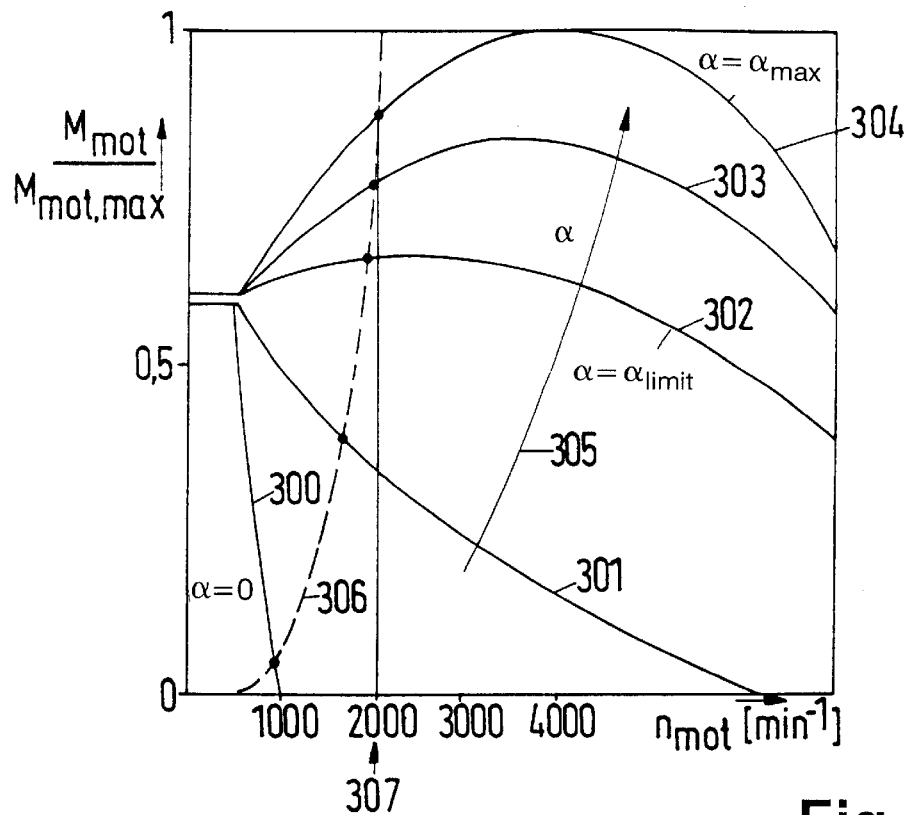
FIG. 5 is a diagram illustrating the normalized engine torque $m_{mot}$ divided by the maximum engine torque $M_{mot,max}$ plotted versus the engine rotation $n_{mot}$.

FIG. 5 shows a diagram where the normalized engine torque $m_{mot}$ divided by the maximum engine torque $M_{mot,max}$ is plotted versus the engine RPM $n_{mot}$. The individual curves 300 to 304 correspond to curves with normalized torque values as a function of the engine RPM at a fixed presentable load lever position a. The curve a denotes the degree or the extent of load lever activation which can be detected by a load lever sensor. The curve 300, for example, is representative of the torque as a function of the engine RPM when the load lever is not activated, i.e. $\alpha\_=0$. The curve 304 characterizes the normalized engine torque as a function of the engine RPM with the load lever operated at its maximum, i.e. at $\alpha\_=\alpha_{max}$. The curves are examples for a respective dependence of the torque on the engine RPM at a given load lever $\alpha$. The arrow 305 points to the order in which the curves are arranged, i.e. according to increasingly actuated load lever. Each curve is indicative of a given position of the load lever. The curve 306 shows, as in FIG. 3, the evolution of the engine torque as a function of the engine RPM during a starting phase, with the final RPM during the starting phase reaching about 2000/min at 307, corresponding to the limit 205 of FIG. 3. The intersections of lines 300, 301, 302, 303, and 304 with the curve 306 represent the torque available from the drive unit, such as the motor, during a starting phase. It can be seen that at a maximum RPM of 2000/min, at maximum load lever, the reduced engine torque is in the range of 0.8 to 0.9, which mean that the minimum engine torque is not reached.

Figure 6:
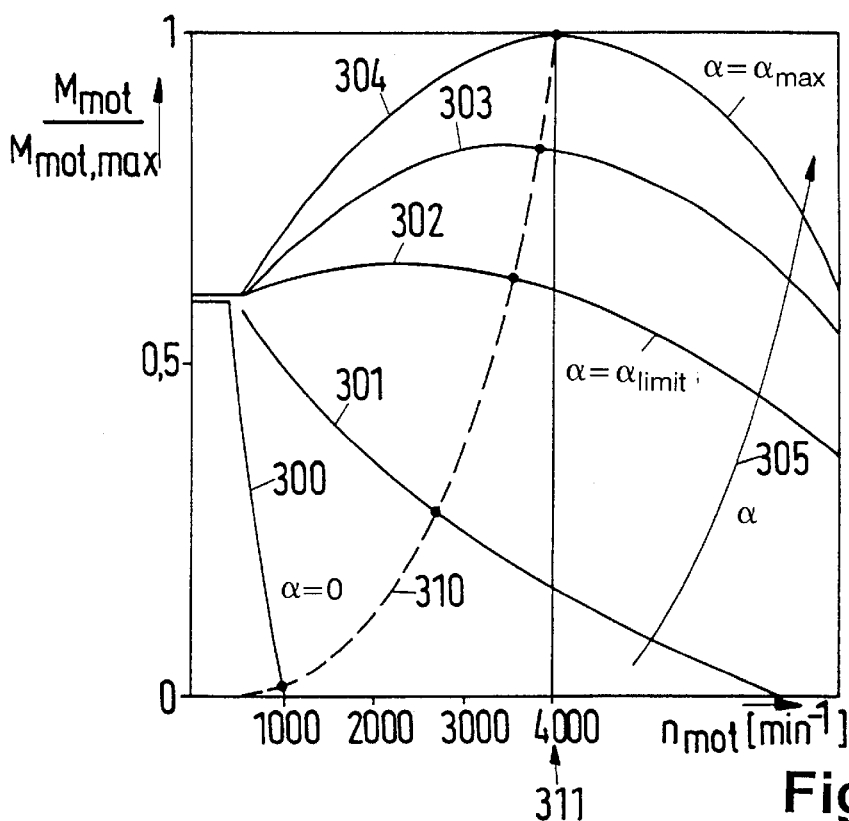
FIG. 6 is a diagram illustrating a reduced engine torque $M_{mot}/M_{mot,max}$ as a function of the engine rotation $n_{mot}$.

FIG. 6 shows, as compared to FIG. 5, a reduced engine torque $M_{mot}/M_{mot,max}$ as a function of the engine RPM $n_{mot}$ wherein the curves 300 to 304 correspond to the curves 300 to 304 of FIG. 5. The arrow 305 points again in the direction of increasing displacement of the load lever. The curve 310 corresponds to a starting characteristic or to the evolution of the engine torque as a function of the engine RPM during a starting phase of FIG. 4, wherein the limit value 210 of FIG. 4 corresponds to the limit value 311 of FIG. 5, which is, for example, 4000/min. As a result of the increased engine limit RPM during the starting phase, the curve 310 intersects the curves 300 to 304 at points different from the points of intersection of curve 306 with curves 300 to 304. It is evident that the torque at higher RPM is close to the maximum torque at constant position of the load lever. Consequently, increased RPM during a starting phase provides a higher torque for accelerating a vehicle.

The curves depicted in FIGS. 3 and 4 and showing the dependence of the RPM on time, on the engine RPM and the transmission input RPM, are the result of controlling the transmittable RPM in a way that the engine torque assumes a stable state with respect to the transmittable torque, while the engine RPM remains essentially constant in the time interval 207 to 209 and in the time interval 211 to 214, respectively.

Figure 7:
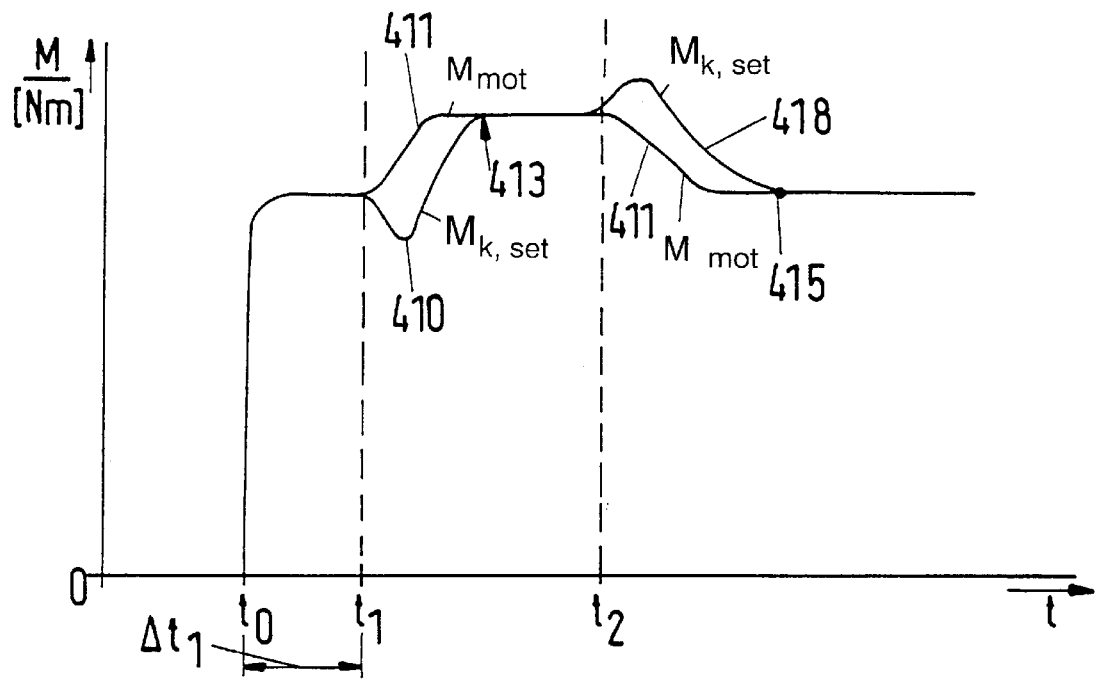
FIG. 7 is a diagram illustrating the engine torque and the transmittable clutch torque as a function of time.

FIG. 7 shows a diagram representing the engine torque and the transmittable clutch torque as a function of time, wherein for $t>t_0$ both the engine torque and the transmittable clutch torque are essentially zero or very small, since during this phase the load lever, e.g. gas pedal, is not activated.

Figure 8:
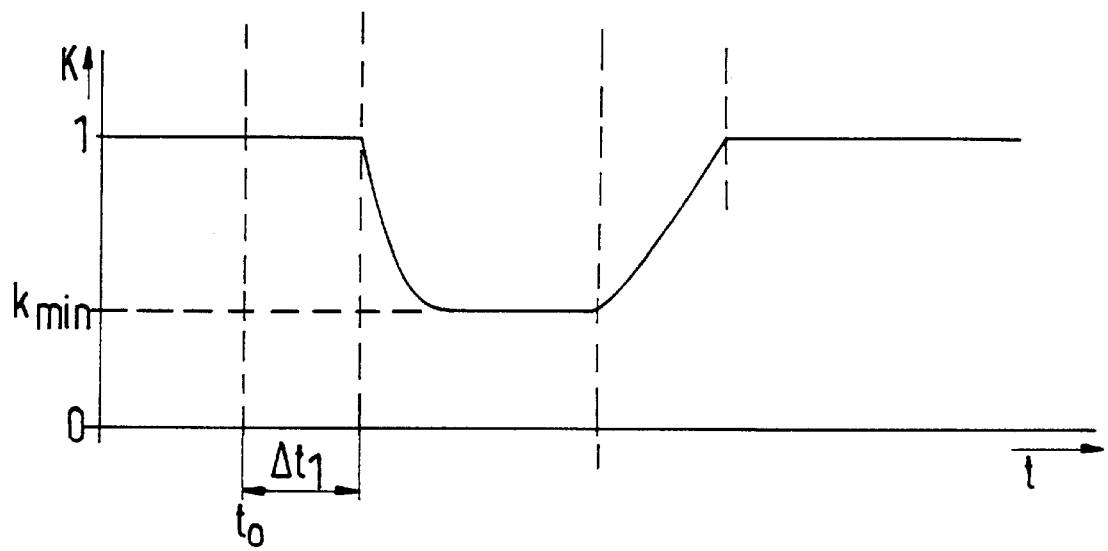
FIG. 8 is a diagram illustrating the factor k used to control the torque transmitting system.

FIG. 8 shows a factor k used to initiate the operation of the torque transmitting system. The clutch torque set point is at least a function of the engine RPM:

$$M_{k,set} = k \; f(n_{mot}, \ldots, \alpha, \ldots),$$

whereby the function may also include other variables. Furthermore, the clutch torque set point or only the transmittable torque of the torque transmitting system may be a function of the engine RPM:

$$M_{k,set} = k * f(n_{mot}).$$

The factor k represents a proportionality factor or adjustment factor capable of initiating small changes.

Figure 9:
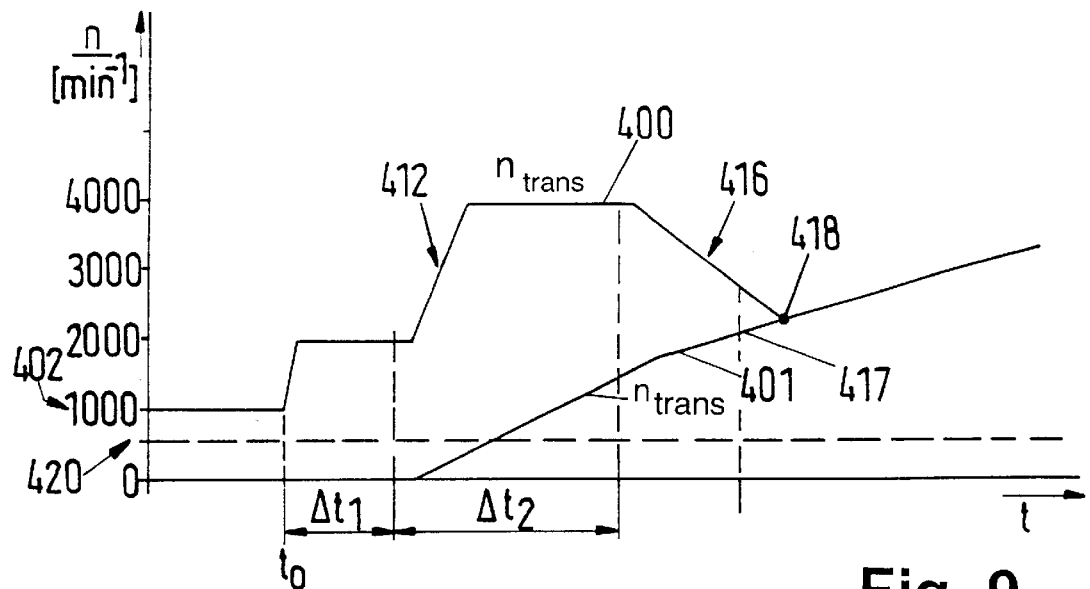
FIG. 9 is a diagram illustrating the engine rotation $n_{mot}$ and the transmission input rotation $n_{trans}$ as a function of time.

FIG. 9 shows a diagram representing the engine RPM $n_{mot}$ 400 and the transmission input RPM $n_{trans}$ 401 as a function of time. For $t<t_0$, the engine RPM is equal to the idling RPM 402. At $t=t_0$, the load lever is operated and both the engine torque and the clutch torque 410 increase with increasing engine RPM, whereby an essentially constant engine RPM is reached during the time interval $\Delta t_1$, while at the same time an essentially constant clutch torque and an essentially constant engine torque is established.

The transmission input RPM 401 increases during the time interval $\Delta t_1$, but stays below a threshold value 420 while the vehicle is either not accelerated at all or accelerated only slightly. This acceleration may be sufficient or insufficient, depending on how the vehicle is adjusted. The acceleration may be insufficient because the vehicle is too heavily loaded and/or pulls a trailer and possibly is positioned on an incline. In this case, the torque transmitted by the engine is insufficient to accelerate the vehicle either at all or adequately. After a certain presentable pause, the transmission input RPM is sampled by the control unit and compared to a reference value or threshold value. If the transmission input RPM is greater than this threshold value, then the acceleration process is continued as described above. If the transmission input RPM is smaller than this limit or threshold value, then a process is initiated which provides a larger engine torque and consequently also a larger torque to the driven wheels for accelerating the vehicle faster than to this point in time.

If it is determined at $t=t_1$ that the transmission input RPM is less than a threshold value, then the factor k is intentionally decreased by the control unit, as depicted in FIG. 8. For example, k is decreased to the value $k_{min}$. As a result of this reduction of the factor k and the fact that the controlled transmittable torque of the torque transmitting system $M_{k,set}$ is equal to k multiplied by a function of the engine RPM, the clutch torque 410 initially decreases after the time $t_1$ while the engine torque 411 increases. The result of this increase in the engine torque is an increase in the engine RPM 400 in the interval 412, whereby the clutch torque increases according to the above formula. During the time interval 413, the engine torque is about equal to the clutch torque set point. As a result of the torque increase and the concurrent RPM increase due to the decrease of the factor k, the transmission input RPM 401 increases during the time interval $\Delta t_2$, resulting in a stronger acceleration.

In this case:

$$M_{k,set} = k_1 * f(n_{mot}),$$

wherein the factor $k_1$ is smaller than k.

If the acceleration values of the vehicle, i.e. the increase in the RPM of the transmission input shaft or in the vehicle speed, is sufficient after a certain time interval subsequent to the start of the acceleration, or if, for example, the energy loss in the region of the friction linings is too large, then the control unit can reduce the engine RPM or the engine torque on the basis of a comparison of these measurement values with, for example, threshold values or mapping. This can be accomplished in that the factor k in the above equation, as depicted in FIG. 8, increases again, for example from time $t_2$ on. When k increases, the clutch torque set point which is equal to k times a function of the engine RPM, increases also via the above described function. The engine torque 411 is hereby decreased, accompanied by a decrease in the engine RPM. When the engine RPM decreases, the clutch torque set point is decreased simultaneously, whereby the engine torque 411 and the clutch torque set point 410 are synchronized at the synchronization point 415. As a result of the decrease of the engine RPM in time interval 416, the slope of the increase of the transmission RPM decreases also in interval 416, which is labeled 417. From the synchronization point 415 on, the engine RPM and the transmission RPM increase essentially coequally.

Figure 10:
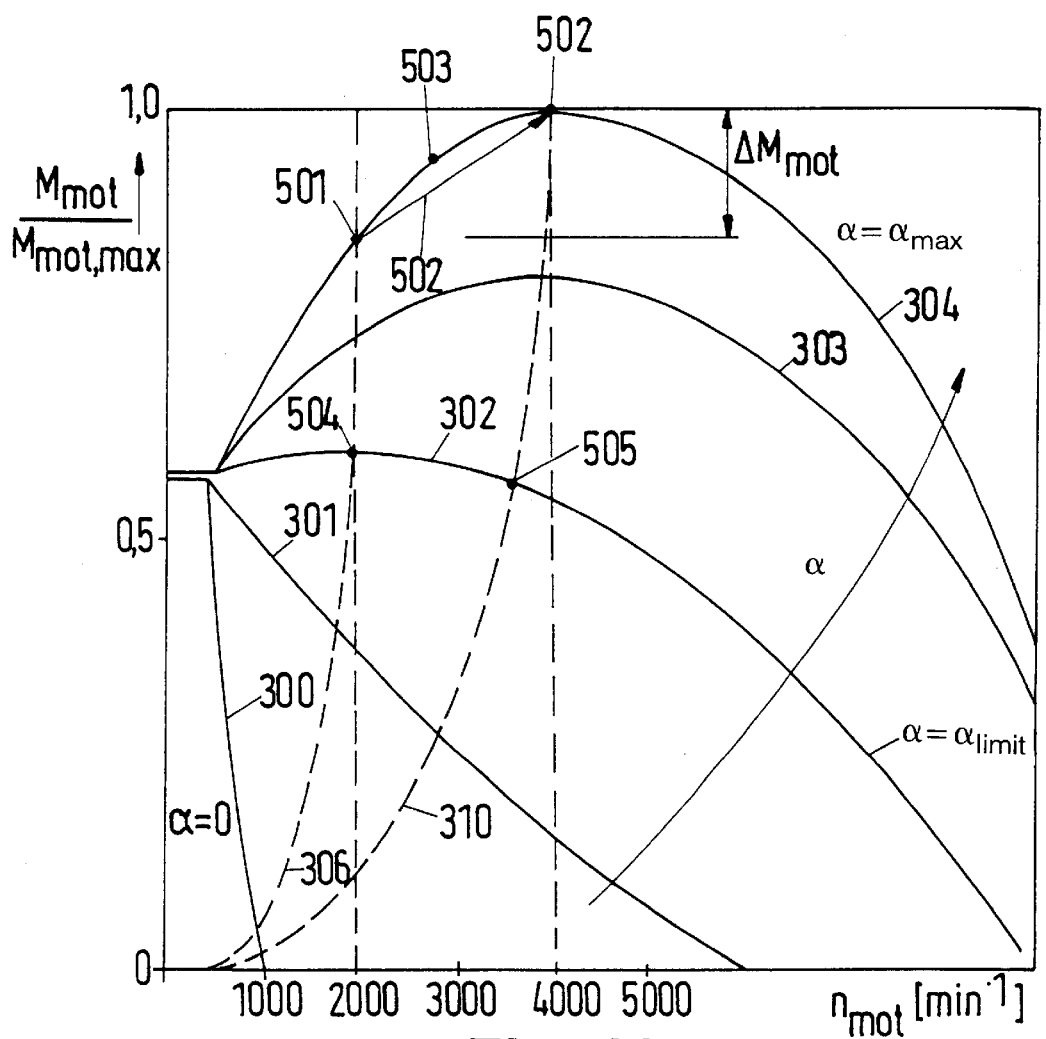
FIG. 10 is a diagram illustrating the reduced engine torque plotted as a function of the engine rotation.

FIG. 10 shows a diagram where the reduced engine torque is plotted as a function of the engine RPM, wherein the curves 300, 301, 302, 303 and 304 as well as the curves 306 and 310 are plotted similarly to the curves in FIGS. 5 and 6. If, according to FIG. 7 or FIG. 9, a starting phase occurs with a low terminal RPM (for example with 2000/min), as shown in 306, then the point 501 is reached where the RPM and the available engine torque in this region are insufficient for accelerating the vehicle at all or for accelerating the vehicle adequately. The control unit evaluates and assesses the operating parameters, such as wheel rotation speed or transmission RPM. If the RPM or the acceleration values are too small, then the control unit selects a higher engine torque, for example by switching from the curve 306 to the curve 310 according to the arrow 502, whereby both the engine RPM and the available engine torque increase. The control is effected by intentionally decreasing the transmittable torque of the torque transmitting system by reducing the factor k, whereby the engine RPM increases and consequently the transmittable torque also increases again. If the control unit adjusts the transmittable torque in the direction of smaller torque values during time interval 416 according to FIGS. 7 and 9, then the arrow 502 points in the opposite direction.

If the acceleration of the vehicle during the time interval $\Delta t_1$ is smaller than a first threshold value, but greater than a second threshold value, then the engine torque can be varied in a manner that regions midway between the engine torque at point 501 and the engine torque at point 502 are also adjusted, such as an engine torque corresponding to point 503. The points 504 and 505 make it clear that for a position $\alpha \_ = \_ \alpha_{limit}$ a switch from the curve 306 to the curve 310 would be associated with a reduction of the available engine torque.

As indicated by the characteristic curves, it would be less useful to effect a change of the engine torque for load lever positions less than the limit $\alpha_{limit}$ when the transition occurs from curve 306 to curve 310. Such change to a curve denoting a lower engine torque may, however, be useful in other operating situations. Such a characteristic curve, for example, may be selected if a smaller engine torque is desirable in situations where the driven wheels lose traction and spin on a slippery surface.

If the transmission input RPM or the wheel RPM speed or the vehicle speed at start-up is too small, the control unit, after a certain time interval, monitors the load lever to ascertain its position at that time, and the process for increasing the torque is initiated if the extent of displacement of the load lever exceeds $\alpha_{limit}$ and the vehicle acceleration is less than a presentable limit value. If the load lever α is smaller than $\alpha_{limit}$, then the process is not executed, since the torque would thereby only be reduced and not increased.

The engine torque available for accelerating or starting is altered by controlling the torque transmittable by the clutch, as shown in FIGS. 7 to 9. Accordingly, a shift with be carried out from a curve 306 or from the operating point 501 to the curve 310 or to the operating point 502. The existing torque at a given or set load lever position a is thereby increased, however, without the need to change the position of the load lever. Similarly, the engine torque can also be reduced.

Figure 11A:
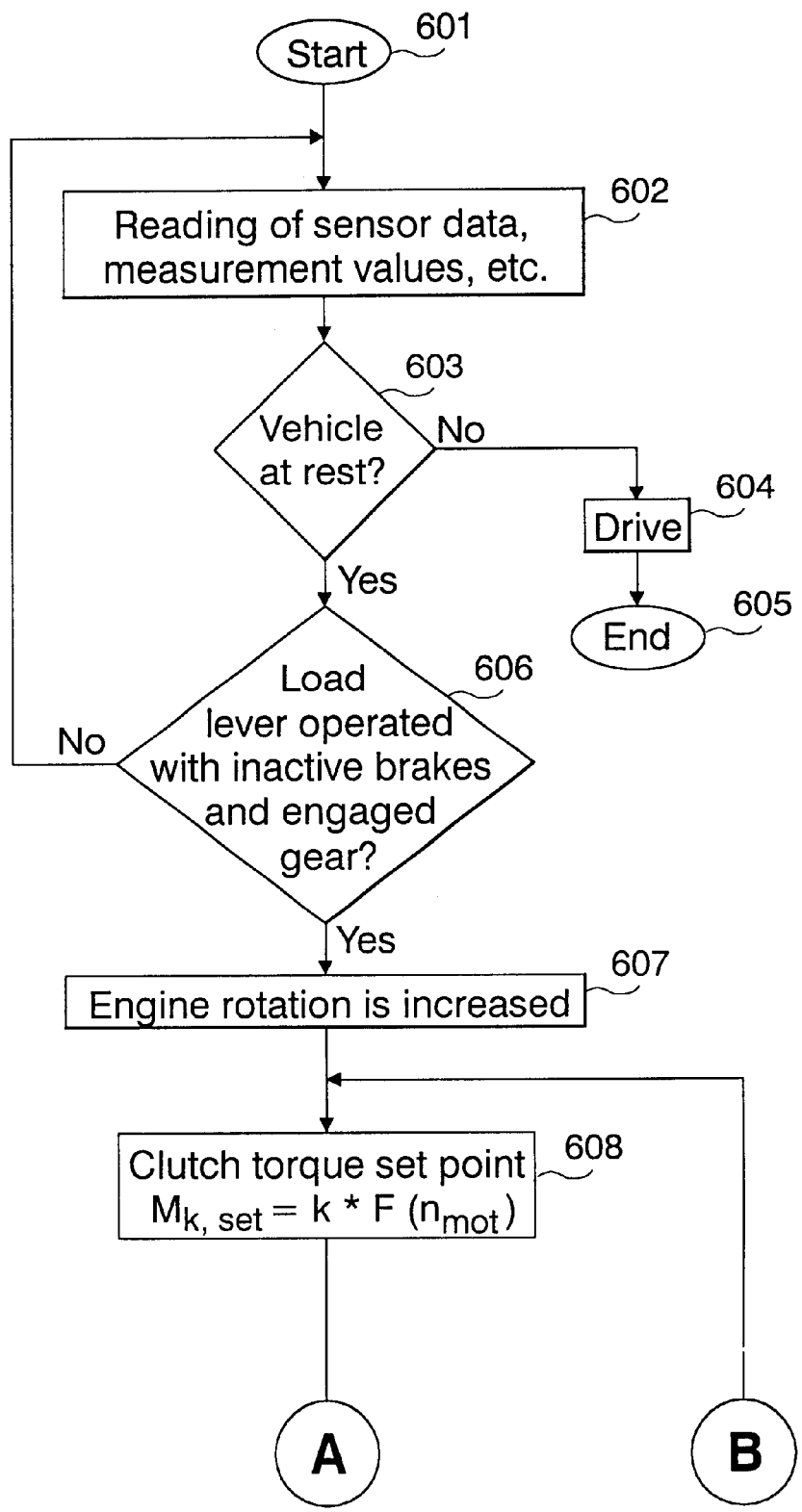
FIGS. 11A and 11B, when joined at connectors A and B, is a block diagram for describin an embodiment of a process according to the invention.
Figure 11B:
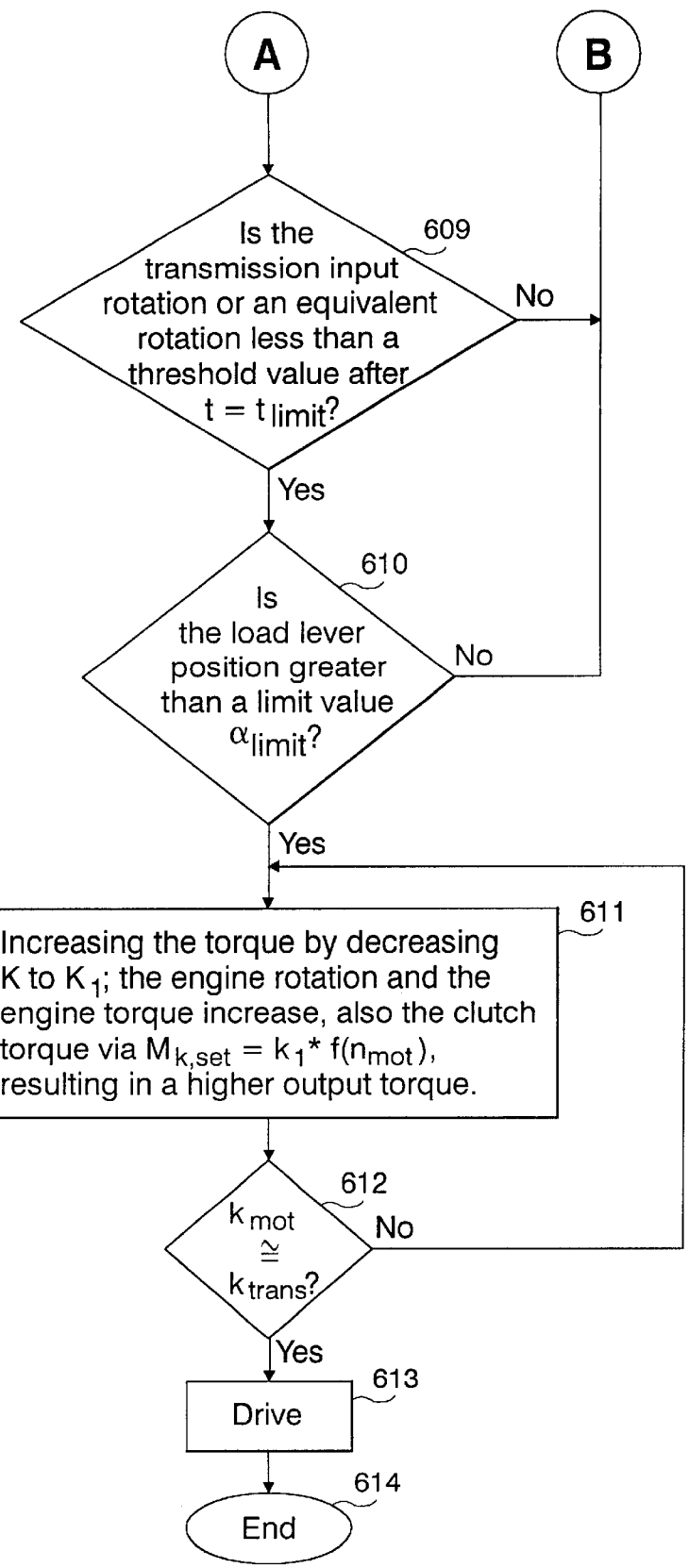

FIG. 11 shows a block diagram for describing an embodiment of a process according to the invention. The block 601 characterizes the start of the process and in block 602, the control unit reads sensor data, measurement values and other operating parameters, for example, from memory, via a data bus from other electronic units or directly from the sensors. In block 603, there is determined if the vehicle is completely at rest or essentially at rest, i.e. the wheel RPM or transmission RPM, with the torque transmitting system disengaged (open), or the vehicle speed are tested and compared with, for example, threshold values. If the sensor signal is below a threshold value, then the control unit sets the status to "At rest", whereas conversely the status "Driving" is set in block 604, and whereby the starting phase is terminated in block 605. If the query in block 603 is answered in the affirmative, i.e. the vehicle is essentially at rest, then there is queried in block 606 whether the load lever is actuated with inactive brakes or engaged gear. If this is not the case then the process is continued with block 602. If the query in block 606 is answered in the affirmative, then the load lever is actuated while the engine electronics increase the engine RPM. Through this increase via the engine electronics, the clutch torque set point in $M_{k,set}$ which is equal to a constant times a function of the engine RPM, is controlled so that a transmittable torque is commanded for allowing the vehicle to start. The engine RPM in block 607 is increased by actuating the load lever via the engine electronics, while the transmittable torque in $M_{k,set}$ in block 608 is selected by the control unit or control device of the apparatus of the invention.

In block 609, there is queried if after a time interval $\alpha t_1$ following the starting phase or after the time $t=t_{limit}$, the transmission input RPM or an RPM representing such transmission input RPM is below a threshold value. An RPM representing the aforementioned transmission input RPM may be, for example, a transmission output RPM and a wheel RPM, such as an averaged wheel RPM or a vehicle speed. If the query in block 609 is answered in the affirmative, then there is queried in block 610 if the load lever is moved to a position beyond a limit value $\alpha_{limit}$. If this is the case, then the torque is increased by decreasing the factor k to a value $k_1$ in the equation in block 608. By reducing the factor k to $k_1$, the controlled transmittable torque of the torque transmitting system is reduced. The result is a smaller load on the engine and an increased engine RPM, whereby the available engine torque increases. The increase in engine RPM causes subsequently the transmittable clutch torque $M_{k,set}$ to also increase, so that a higher output torque can be transmitted on the drive side for accelerating the vehicle. The increase in the available torque is controlled in block 611. In block 612, there is queried if the engine RPM is essentially equal to the transmission input RPM. If this is the case, then there will be a switch to "Driving" in block 613 and the process is terminated at 614.

If the engine RPM is not equal to the transmission input RPM, then the clutch torque set point continues to be controlled as a function of the engine RPM, with the increased torque provided by block 611.

Figure 12:
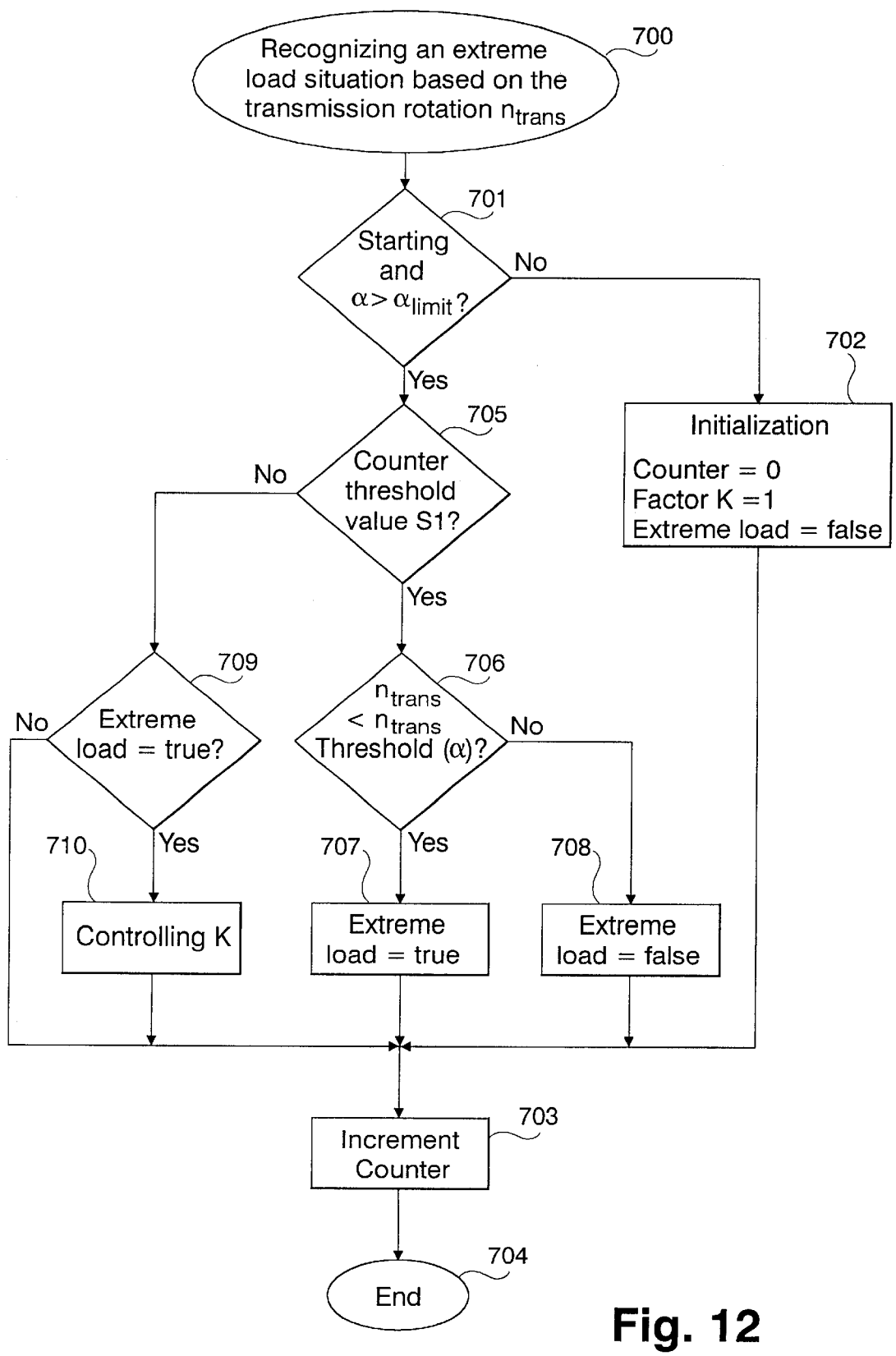
FIG. 12 is a block diagram, similar to a flow chart, illustrating an example of the flow of a process according to the invention.

FIG. 12 shows a block diagram, similar to a flow chart, which shows, in form of an example, the progress of a process according to the invention. In block 700, an extreme load situation is detected based on the transmission RPM $n_{trans}$. This flow cycle is initiated periodically, for example with a clock period in the range of milliseconds. The clock rate used for executing this procedure depends on the clock rate of the computer unit of the control unit, and may cover the range of less than 1 millisecond to a range of seconds. Preferred is a repetition rate in the millisecond regime, i.e. 1 to 100 milliseconds. After the flow cycle is initialized and has started according to the block diagram, there is queried in block 701, if the flow cycle relates to a starting phase and if the quantity a is greater than a limit value $\alpha_{limit}$. A starting phase takes place if, for example, the load lever is actuated and the throttle valve is operated at least partially as a result of actuation of the load lever. A starting phase also takes place if simultaneously a gear is engaged in the transmission and the emergency or operating brake of the vehicle is not activated. In this example, the load lever position or the throttle valve position can be used. If the condition of block 701 is not satisfied, then an initialization is performed in block 702, i.e. a counter is set to zero, the factor k used for calculating the clutch torque set point, as shown in FIG. 11, block 608, is set to K=1, and a status byte for indicating an extreme load, is set to "false". This status byte, like a flag, is for example equal to zero if an extreme load is not present, i.e. the extreme load is set to "false", or in the case where an extreme load is present, i.e. the extreme load is true, the byte is set.

After the initialization denoted by the block 702 has been completed, the counter in block 703 is incremented before the flow cycle is terminated in block 704. If during the subsequent pass of this flow cycle which is executed, as explained above, with the clock rate, the query in block 701 is answered positively, then there is queried in block 705 if the counter has reached a threshold value S1. It can also be queried if the signal from the counter is larger or smaller than the threshold value S1. The threshold value S1 is indicative of the time after the starting phase which must elapse before a query can determine if the acceleration is sufficient or if a quantity representative of the acceleration has reached a threshold value. Consequently, between the time that the counter is set to zero or initialized and the time of the threshold value S1, there elapses the time interval $\Delta t_1$. This has already been described and explained in connection with the FIGS. 7 to 9.

If the query in block 705 is answered positively, then there is queried in block 706 if the transmission RPM is smaller than a threshold value $n_{trans}$, with a threshold of Δ. If the query in block 706 is answered positively, then the status byte in block 707 indicating the extreme load is set to true, i.e. to 1. If the query in block 706 is answered negatively, then the status byte in block 708 indicating the extreme load is set to false, i.e. to 0. Subsequently, the counter in block 703 is incremented and the procedure for that clock cycle is terminated at 704. If the query in block 705 is answered negatively, then there is queried in block 709 if an extreme load is present, i.e. equal to true or if the status byte is equal to 1. If an extreme load is present, then a flow cycle is initiated in block 710 resulting in an increase of the available engine torque. This flow cycle of block 710 will be described and explained in detail in FIG. 13. If the query in block 709 is answered negatively, then the counter in block 703 is incremented and the procedure for that clock cycle is terminated at 704.

Figure 13:
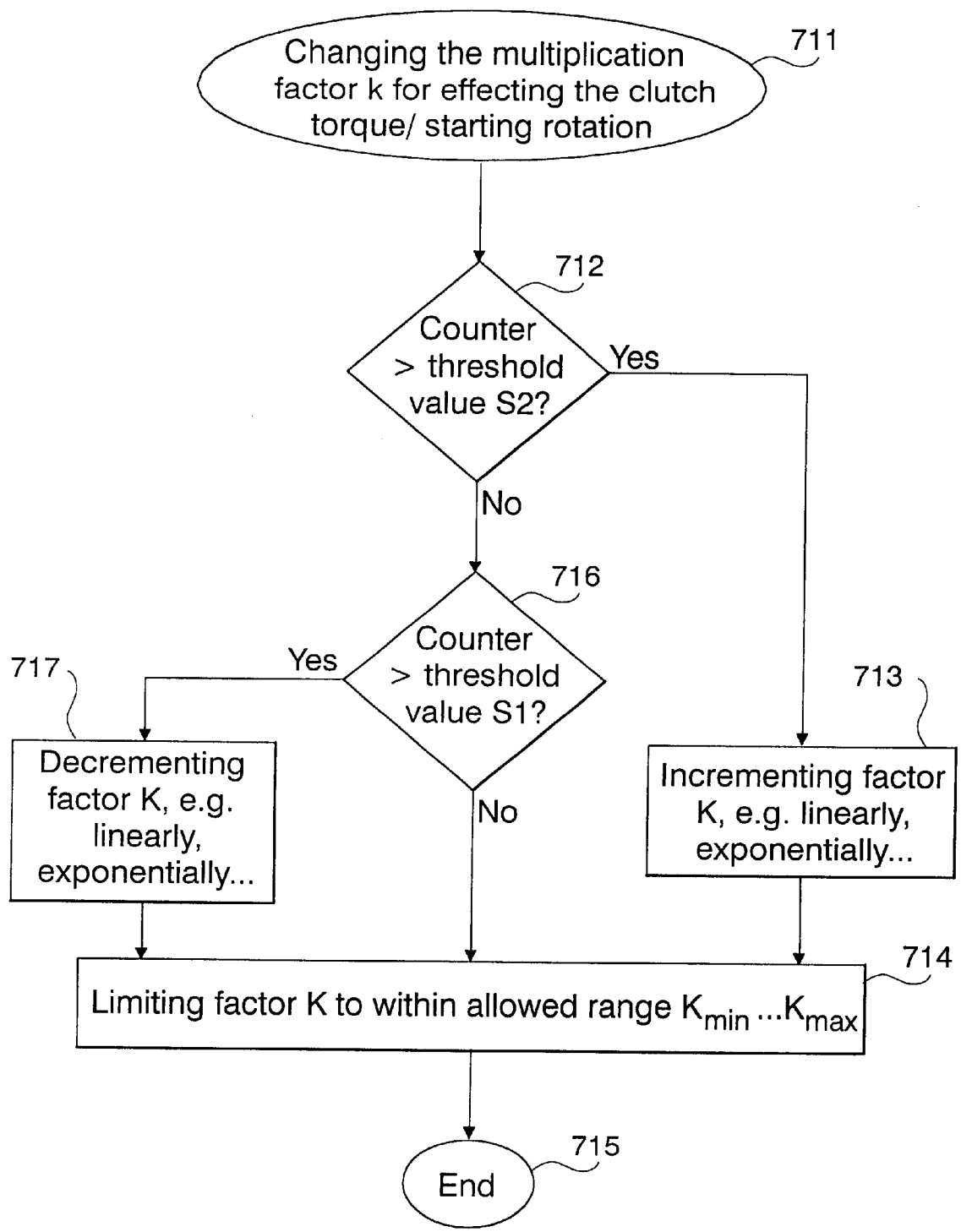
FIG. 13 is an enlargement of block 710 of FIG. 12.

FIG. 13 shows the block 710 of FIG. 12 in more detail, namely that embodiment wherein that process controls the change of the multiplication factor K for influencing the clutch torque and the starting RPM, respectively. This control provides an increased drive torque for improved acceleration of the vehicle. The routine for changing the multiplication factor K for influencing the clutch torque and the starting RPM, respectively, is initialized in block 711. In block 712, there is queried if the counter setting exceeds a threshold value S2. This threshold value S2 corresponds to the time $t_2$ in FIG. 7, after which time the value K of FIG. 8 is increased for reducing the engine torque 411 of FIG. 7. If the setting of the counter in block 712 is indicative of a valve larger than a threshold value, then the factor K is incremented in block 713, i.e. increased, which can be accomplished in a linear or exponential or quadratic fashion or by using another functional relationship. In block 714, the factor K is subsequently limited to within a permissible range from $K_{min}$ to $K_{max}$, i.e. if the value K, after it has been incremented, exceeds a maximum value, then the value K is set to and maintained at the maximum value. The flow cycle for the prevailing clock cycle is terminated in block 715.

If the query in the block 712 is answered in the negative, i.e. the valve denoted by the counter is not greater than the threshold value S2, then there is queried in block 716 if the value denoted by the counter is larger than a threshold value S1. If this is the case, then the factor K is decremented in block 717, i.e. decreased or reduced, and this can be accomplished with a linear or exponential or another functional relationship. In block 714, the factor K is once more confined to within an acceptable range from $K_{min}$ to $K_{max}$, so that the factor K in block 717, when decremented in such a way that K would lie below the minimum value $K_{min}$, is then set to and maintained at the value $K_{min}$.

If the query of block 716 is answered in the negative, then the factor K in block 714 is again confined to the acceptable range, before the flow cycle for the prevailing clock cycle is terminated in block 715.

Without further analysis, the forgoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of controlled automated gear shift transmissions and, therefore, such adaptations should and are intended to be comprehended within the meaning and range of equivalence of the appended claims.

What is claimed is:

1. Apparatus for regulating the transmission of torque by an adjustable automated torque transmitting system in the power train of an acceleratable motor vehicle wherein an energy consuming prime mover is arranged to furnish a variable prime mover torque and has a variable-RPM output element and a transmission is shiftable into a plurality of different gears, one of said system and said transmission being arranged to transmit torque to the other of said system and said transmission, comprising:

a control unit arranged to receive and process a plurality of signals and having an output for processed signals;

means for transmitting to said control unit first signals denoting the acceleration of the vehicle;

means for transmitting to said control unit second signals denoting the positions of a multiple-position member for selecting the rate of energy consumption by the prime mover; and at least one actuator responsive to said processed signals to regulate the transmission of torque by said system, said system being adjustable to assume a plurality of conditions when the acceleration of the vehicle is below a predetermined value and said member assumes a predetermined position, said conditions including a first condition in which the magnitude of the torque being transmitted by said system decreases with an attendant rise of the RPM of said output element, and a second condition in which the torque being transmitted by said system increases with attendant rise of the prime mover torque.

2. A method of regulating the transmission of torque by an adjustable automated torque transmitting system in the power train of an acceleratable motor vehicle wherein an energy consuming prime mover is arranged to furnish a variable prime mover torque and has a variable-RPM output element and a transmission shiftable into a plurality of different gears, wherein one of said system and said transmission is arranged to transmit torque to the other of said system and said transmission, wherein a control unit is arranged to receive and process a plurality of signals and has an output for processed signals, and wherein at least one actuator is responsive to signals processed by the control unit to automatically regulate the transmission of torque by said system, comprising the steps of:

generating and automatically transmitting to the control unit signals denoting the condition of the vehicle including generating signals denoting the acceleration of the vehicle and the rate of energy consumption by the vehicle; and regulating said system to assume a plurality of conditions when the acceleration of the vehicle at a predetermined energy consumption by the prime mover is below a predetermined value, said conditions including a first condition in which the magnitude of the torque being transmitted by said system decreases at least slightly with attendant rise of the RPM of the output element, and a second condition in which the torque being transmitted by said system increases with attendant increase of the prime mover torque.

3. An apparatus for regulating an amount of transmittable torque that can be transmitted from an input side to an output side of an adjustable automated torque-transmitting system in the power train of a motor vehicle, the motor vehicle having an engine generating an engine torque through an output element rotating at a variable engine rpm-rate and a transmission shiftable into a plurality of different gears, said apparatus comprising:

a control unit arranged to receive and process a plurality of input signals and having an output for control signals;

means for transmitting to said control unit a first input signal indicating an acceleration of the motor vehicle;

means for transmitting to said control unit a second input signal indicating a pedal position of an accelerator pedal of the motor vehicle; and at least one actuator that regulates said amount of transmittable torque in response to one of said control signals; wherein A) if said first input signal indicates an acceleration that is too low in relation to said pedal position, the control unit causes the actuator to perform an automatic change between degrees of actuation that correspond to different amounts of transmittable torque, where in a first phase One of said automatic change, the amount of transmittable torque is at least slightly lowered, causing the engine rpm-rate to increase; and in a first phase Two of said automatic change, the transmittable torque is raised to be higher than before the automatic change, so that a larger amount of engine torque is made available to accelerate the motor vehicle; and B) if said first input signal indicates an acceleration that is too high in relation to said pedal position, the control unit causes the actuator to perform an automatic change between degrees of actuation that correspond to different amounts of transmittable torque, where in a second phase One of said automatic change, the amount of transmittable torque is at least slightly raised; and in a second phase Two of said automatic change, the transmittable torque is decreased to be lower than before the automatic change, so that a lesser amount of engine torque is made available to accelerate the motor vehicle.

4. The apparatus according to claim 3, further comprising means for transmitting to said control unit a third input signal indicating an operating state of the motor vehicle selected from the operating states of take-off and acceleration, wherein the control unit causes the actuator to perform said automatic change if said third input signal is present.

5. The apparatus according to claim 3, wherein the control unit is further arranged to receive, register and process data sets that include said input signals, sensor signals, values of operating variables, and values of operating parameters, and wherein the control unit causes the actuator to perform said automatic change dependent on said data sets.

6. The apparatus of claim 5, wherein the control unit compares at least one of said data sets to at least one prescribed threshold value, said threshold value representing a border between an acceleration that is too low and an acceleration that is too high, and wherein the control unit causes the actuator to perform said automatic change if said comparison indicates that the at least one data set being compared meets at least one of the conditions of having arrived at the threshold and of having passed through the threshold.

7. The apparatus of claim 6, wherein at least one of said data sets is received, registered and processed as a function of time and wherein the control unit causes the actuator to perform said automatic change if said at least one condition has occurred within a predetermined amount of time.

8. The apparatus of claim 6, wherein the at least one data set being compared is constituted by the second input signal.

9. The apparatus of claim 7, wherein the at least one data set being compared is representative of a transmission input rpm-rate.

10. The apparatus of claim 3, wherein:

if condition A) applies, a target value is set for the transmittable torque to be available after the automatic change that is higher than the current transmittable torque and wherein in the first phase Two of said automatic change, the transmittable torque is raised to said higher target value; and if condition B) applies, a target value is set for the transmittable torque to be available after the automatic change that is lower than the current transmittable torque and wherein in the second phase Two of said automatic change, the transmittable torque is lowered to said lower target value.

11. The apparatus according to claim 3, wherein the control unit regulates the transmittable torque to a target torque level $M_{kset}$, said target torque level $M_{kset}$ being a function of the engine rpm-rate and being mathematically described by the equation $M_{kset}=k*f(n_{mot})$.

12. The apparatus according to claim 11, wherein the control unit selects the factor k in a range from 0 to $k_{max}$ and wherein further, the control unit changes said selection of the factor k at the time of said automatic change.

13. The apparatus of claim 10, wherein the torque-transmitting system delivers an output torque at the output side and wherein, if condition A) applies, the control unit controls the transmittable torque in such a manner that the output torque is increased.

14. A method of regulating an amount of transmittable torque that can be transmitted from an input side to an output side of an adjustable automated torque-transmitting system in the power train of a motor vehicle, the motor vehicle comprising an engine generating an engine torque through an output element rotating at a variable engine rpm-rate, a transmission shiftable into a plurality of different gears, and a control unit arranged to receive and process a plurality of data sets that include a first input signal indicating an acceleration of the motor vehicle, a second input signal indicating a pedal position of an accelerator pedal of the motor vehicle, and a third input signal indicating an operating state of the motor vehicle selected from the operating states of take-off and acceleration; the method comprising the steps of:

a) determining the operating state from the third input signal;

b) determining from the first and second input signals if the acceleration is within a prescribed range in relation to said pedal position; and c1) if the acceleration is too low, issuing a first control signal that will cause the actuator to perform an automatic change between degrees of actuation that correspond to different amounts of transmittable torque, in such a manner that in a first phase One of said automatic change, the amount of transmittable torque is at least slightly lowered, causing the engine rpm-rate to increase; and in a first phase Two of said automatic change, the transmittable torque is raised to be higher than before the automatic change, so that a larger amount of engine torque is made available to accelerate the motor vehicle;

c2) if the acceleration is too high, issuing a second control signal that will cause the actuator to perform an automatic change between degrees of actuation that correspond to different amounts of transmittable torque, in such a manner that in a second phase One of said automatic change, the amount of transmittable torque is at least slightly increased; and in a second phase Two of said automatic change, the transmittable torque is decreased to be lower than before the automatic change, so that a lesser amount of engine torque is made available to accelerate the motor vehicle.

15. The method according to claim 14, wherein the third input signal indicates said operating state by signaling to the control unit at least one of a depressed state of the accelerator pedal, a non-activated state of a vehicle brake, and an engaged state of one of the gears of the transmission.

16. The method according to claim 14, within the control unit is arranged to receive and process at least one of said plurality of data sets as a function of time, so that said at least one data set represents a measure for at least one of vehicle speed and vehicle acceleration; wherein the method further comprises the steps of prescribing a magnitude of a threshold value and of comparing said at least one data set to said threshold value.

17. An apparatus for regulating an amount of transmittable torque that can be transmitted from an input side to an output side of an adjustable automated torque-transmitting system in the power train of a motor vehicle, the motor vehicle having an engine generating an engine torque through an output element rotating at a variable engine rpm-rate and a transmission shiftable into a plurality of different gears, said apparatus comprising:

a control unit arranged to receive and process a plurality of input signals and having an output for control signals;

means for transmitting to said control unit a first input signal indicating an acceleration of the motor vehicle;

means for transmitting to said control unit a second input signal indicating a pedal position of an accelerator pedal of the motor vehicle; and at least one actuator that regulates said amount of transmittable torque in response to one of said control signals;

wherein if said first input signal indicates an acceleration that is too low in relation to said pedal position, the control unit causes the actuator to perform an automatic change between degrees of actuation that correspond to different amounts of transmittable torque, where in a first phase of said automatic change, the amount of transmittable torque is at least slightly lowered, causing the engine rpm-rate to increase; and in a second phase of said automatic change, the transmittable torque is raised to be higher than before the automatic change, so that a larger amount of engine torque is made available to accelerate the motor vehicle.

18. An apparatus for regulating an amount of transmittable torque that can be transmitted from an input side to an output side of an adjustable automated torque-transmitting system in the power train of a motor vehicle, the motor vehicle having an engine generating an engine torque through an output element rotating at a variable engine rpm-rate and a transmission shiftable into a plurality of different gears, said apparatus comprising:

a control unit arranged to receive and process a plurality of input signals and having an output for control signals;

means for transmitting to said control unit a first input signal indicating an acceleration of the motor vehicle;

means for transmitting to said control unit a second input signal indicating a pedal position of an accelerator pedal of the motor vehicle; and at least one actuator that regulates said amount of transmittable torque in response to one of said control signals;

wherein if said first input signal indicates an acceleration that is too high in relation to said pedal position, the control unit causes the actuator to perform an automatic change between degrees of actuation that correspond to different amounts of transmittable torque, where in a first phase of said automatic change, the amount of transmittable torque is at least slightly raised; and in a second phase of said automatic change, the transmittable torque is decreased to be lower than before the automatic change, so that a lesser amount of engine torque is made available to accelerate the motor vehicle.

* * * * *